Inventors:
Robert H. Johnson,
Walter R. Nial,
by *Larry R. Mayers*
Their Attorney.

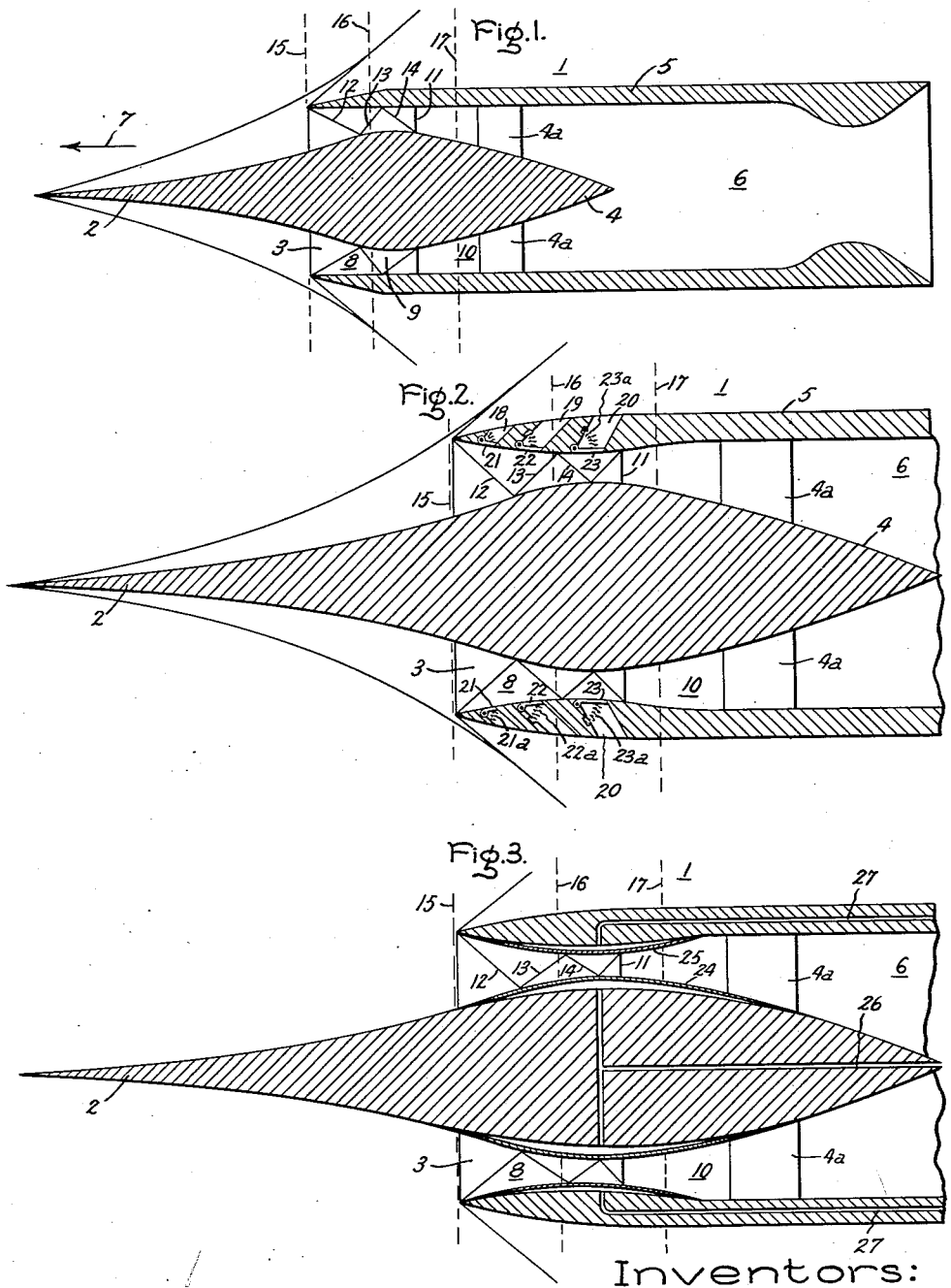

United States Patent Office 2,966,028
Patented Dec. 27, 1960

2,966,028

AERODYNAMIC DIFFUSER MECHANISMS

Robert H. Johnson, Schenectady, and Walter R. Nial, Troy, N.Y., assignors to General Electric Company, a corporation of New York Filed Oct. 17, 1947, Ser. No. 780,498

19 Claims. (Cl. 60—35.6)

This invention relates generally to mechanisms such as diffusers for increasing pressure within an elastic fluid by converting the kinetic energy inherent in the flow of such a fluid moving through or with respect to the diffuser mechanism into pressure energy. It has for its general object the provision of diffuser mechanisms having improved operating characteristics resulting from the provision of means for initially establishing, reestablishing or maintaining the fluid flow pattern desired in the diffuser throughout the normal range of operating conditions for which it is designed. Other objects include the provision of diffuser mechanisms characterized by features which afford a greater final pressure increase than those characterizing prior art devices, features which permit a closer approach to reversible adiabatic diffusion, features for effecting the aforesaid flow establishment, reestablishment or maintenance action automatically, together with an improved means for utilizing certain portions of the fluid flow as a coolant for any high temperature devices, such as combustion chambers, associated with the mechanisms.

Figure 4:
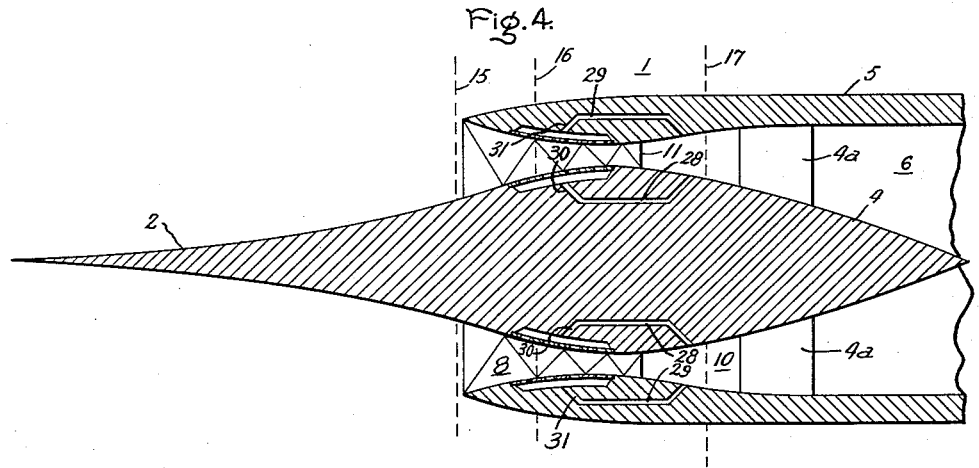
Figure 5:
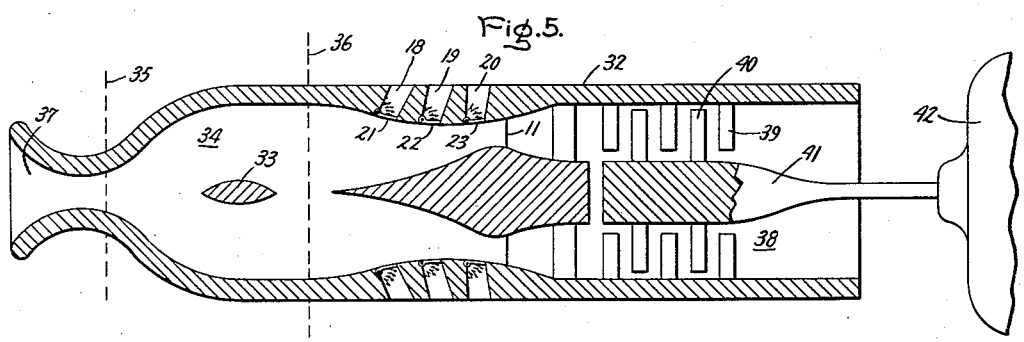
Figure 6:
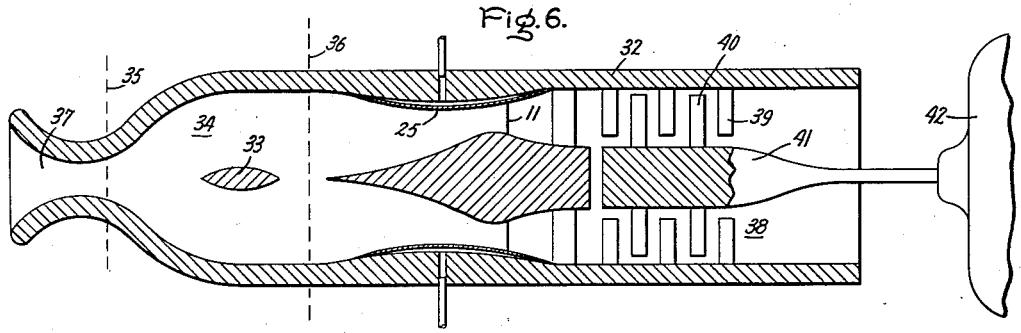

The features of the invention desired to be protected are set forth in the appended claims. The invention itself together with further objects and advantages thereof may best be understood by reference to the following specification when taken in connection with the accompanying drawings in which the Fig. 1 represents in schematic cross-section a diffuser of the type to which the invention is related and which is employed to illustrate certain of the problems of that type which it is the object of the present invention to solve; Figs. 2 and 3 represent in schematic cross section, diffusers improved by the embodiment of the present invention therein; the Fig. 4 represents in schematic cross section, a diffuser of the type shown in Figures 2 and 3 incorporating certain automatic regulating features for maintaining or establishing the desired pattern of fluid flow; while the Figures 5 and 6 represent illustrative wind tunnel construction which might incorporate the improved features of the previous figures. Because of the similarity of the constructions illustrated by all figures, like numerals have been used to designate like parts throughout.

As is well known in the art to which the invention relates, mechanisms of the aforementioned character find numerous general applications in dynamic fluid devices such as high speed aerodynamic craft (ramjets), centrifugal compressors, gas turbines, wind tunnels, superchargers or like devices. Generally, it is the function of such devices to convert the kinetic energy inherent in a rapid relative motion between the elastic fluid and the mechanism into useful pressure energy, a result which may be obtained by appropriately designing the diffuser to effect a reduction of the initially rapid relative motion between the diffuser mechanism and the fluid to a relatively slow relative motion within a desired region such as a confined chamber within the diffuser. Such a chamber may, for example, comprise a combustion chamber or precombustion chamber of an internal combustion device moving through the fluid or it may comprise the high pressure chamber of a centrifugal compressor or gas turbine. A diffuser may, therefore, be thought of as any device for converting the kinetic energy of a high velocity fluid stream into the pressure energy of a lower velocity fluid stream.

Numerous types of diffuser designs are known in the art. However, in elementary and common form, a diffuser comprises simply a tube-like channel which guides the elastic fluid flow and which has a cross section varying along the path of the flow whereby the resultant varying volumetric conditions within the fluid give rise to desired pressure increase. At supersonic velocities (velocities greater than that of sound), channels of this nature which converge in the direction of the flow will effect a pressure rise, while at subsonic (velocties less than that of sound) a diverging channel is required to give the same effect.

It is further known that when the fluid velocity exceeds that of sound, the pressure conditions within the diffuser become affected by the phenomenon of shock waves. Shock waves may be considered to be disturbances in the fluid flow caused by sound waves emitted from irregularities of shape of the diffuser body as a consequence of sudden changes in the direction of the fluid flow in the neighborhood of the irregularities. Generally, the shock wave emanating from a given irregular point may be viewed as the envelope of sound waves given off at the point and thus may be represented by a line extending in the direction of the flow and obliquely thereto at an angle proportional to the ratio of the speed of sound to the speed of flow. The angle will also be affected by the angle of the deflecting surface at the point of irregularity; that is, by the degree to which it tends to deflect the flow. This line may be thought of as a line of discontinuity in the pressure-velocity condition of the fluid since as the fluid passes through the shock wave its pressure, density and temperature are suddenly increased, that change taking place at the expense of the fluid velocity which is thereby decreased in the transition. The following expression derived from energy concepts may be used to represent the phenomena of the transition:

$$KE_1 + P_1 = KE_2 + P_2 + \text{losses} \tag{1}$$

That is, the kinetic energy ($KE_1$) and the pressure energy ($P_1$) ahead of the shock wave are equal to the kinetic enregy ($KE_2$) and the pressure energy ($P_2$) after the shock wave plus any losses which may be incurred as the fluid passes through the shock wave discontinuity. These losses may be attributed to an extremely rapid deceleration of the fluid particles within the very small width of the shock waves (e.g. 1/300 of a millimeter). That deceleration brings about friction between the molecular particles of the fluid which thereby convert some of the available velocity energy into thermal energy constituting heat losses. The larger the magnitude of the shock wave, that is, the larger the pressure rise across the wave becomes, the larger the loss factor will be.

It is further known that when under appropriate conditions the nature of the fluid flow changes from supersonic to subsonic velocity, the boundary line between the regions of these two velocity ranges generally takes the form of what may be termed a normal shock wave represented by a line of discontinuity normal to the direction of flow of the fluid. Such a normal shock wave may exist without the presence in the fluid flow of any other shock waves, or it may exist downstream from a single shock or follow the last of a series of successive shock waves arranged to build up the fluid pressure upstream from the normal shock wave. An aerodynamic device employing such a series of pressure-building shock waves in the form of a multi-reflected shock wave followed by a normal shock wave is shown and claimed in the applicants' co-pending application Serial No. 746,168 now abandoned, entitled Aerodynamic Diffuser Mechanisms, filed May 5, 1947 and assigned to the same assignee as the present application.

Generally in designing diffusers for converting from supersonic to subsonic fluid flow, the diffuser mechanism is so designed that this normal shock wave will, for the range of fluid velocities, pressures and other conditions which the mechanism will encounter in normal operation, remain in a stable position so selected that the optimum efficiency in the diffusion process results. In most cases, that position is slightly downstream from the throat section of the diffuser i.e. the point of narrowest constriction in the channel guiding the fluid flow. Moreover, it is obviously desirable that the normal shock wave remain stably in this design position over the widest possible range of pressure and velocity conditions. This requirement leads to some difficulty when, as usual, a wide range of permissible operating velocities is necessary in practice. The difficulty is particularly troublesome in the low velocity ranges which are necessarily, albeit temporarily, encountered under emergency conditions or during the normal starting operation of the device, for example, in the initial period of time during which velocities are being raised to the normal desired operating velocities, as when an aircraft is taking off. During such initial or emergency periods it is found particularly difficult to cause the normal shock waves to form in the diffusion channel in the desired or design position. In many circumstances, it will have a tendency to form initially entirely outside the inlet of the channel and to remain there unless extraordinary steps are taken to force it to be swallowed within the channel. In others, such as when the device experiences temporary diminutions in fluid flow velocity, it will regurgitate out of the channel and remain there until again caused to be swallowed by appropriate measures. It is precisely this problem which is the primary object of the invention to solve.

Before proceeding to a further description of the invention itself and in order to more fully indicate the nature of the problem to be solved, reference may be made to the Figure 1 and to the following more detailed analysis of the principle of operation of the type of diffuser there shown.

In the Figure 1 there is shown an illustrative diffuser, for example, that of a ramjet as illustrated in the Figure 1 of the aforementioned application Serial No. 746,168. This may comprise, for example, the longitudinal cross section of a high speed aerodynamic craft or ramjet in which the relative velocity between the craft and the surrounding air is utilized to build up pressure in a pressure chamber. Such a pressure chamber could be used as a combustion chamber or precombustion chamber in an internal combustion device driving the craft. The craft may comprise any suitable streamlined body 1 designed to pass through the air with a minimum amount of drag and other disturbing forces and having a forward or nose portion 2, a fluid flow channel 3 formed within the body 1, that is, by the opposing walls of an annular outer portion 5 of body 1 and a central main portion 4 of circular cross section supported by struts 4a in portion 5. At the trailing end of channel 3, the channel flares outward into an enlarged region or chamber 6 in which it is desired to build up the useful high pressure. The craft may be designed in any suitable alternative shape, that is, the section shown in Figure 1 may as indicated, constitute a longitudinal cross section of a generally cylindrical-shaped object moving through the air in the direction of the arrow 7. Or alternatively, it may be a cross section of a generally planar object such as an airfoil or fuselage having generally planar portions 4 and 5.

It will be understood that in the normal operation for which the mechanism is designed, the fluid flow will enter the channel 3 and will experience such velocity changes due to the configuration of the channel as will raise its pressure to a useful value. To this end, the channel may comprise a converging section 8 upstream from the throat 9 and a diverging section 10 downstream from the throat 9 (the cross section at the point of narrow constriction). For the range of fluid velocities, pressure and other conditions which the mechanism will encounter in practical operation for the purpose for which it is intended, the velocity and pressure conditions of the fluid flow in section 8 will be in supersonic condition while in the section 10 it will be in a subsonic condition at a substantially greater pressure than that of the section 8. The boundary line between the two regions of these respective conditions will be a normal shock wave which as indicated, will normally form at a point just downstream from the throat as indicated by the line 11. Methods for creating pressure and velocity conditions on opposite sides of a normal shock wave of this nature are shown in the aforementioned application Serial No. 746,168 in which it is shown that diffusion may be accomplished by multiple reflected shock waves 12, 13 and 14 originating at the tip of the member 5, those reflected shock waves being reflected back and forth between the opposite walls of the section 8 until they terminate in the normal shock wave 11.

While under the designed operating conditions, the normal shock wave may establish itself stably in the position indicated by the line 11, nevertheless, during the initial starting operations of the apparatus or other temporary periods of relatively slow flight when the fluid flow may be relatively slow, the normal shock wave will show a tendency first to establish itself outside of the inlet of the channel 3 in a position indicated generally by the dotted line 15. This represents an undesirable position from the standpoint of efficiency of the apparatus and means must be used to cause the shock wave to be swallowed or to force it downstream until it reaches and remains at the normal desired position of line 11. If thereafter due to any temporary diminution in the air flow velocity, the normal shock wave regurgitates upstream into the channel section 8, then because of the fact that the normal shock wave can not exist stably within a converging channel it will pass completely out of the section 8 until it again reaches the undesirable position of line 15 just outside the inlet orifice. Here again means will have to be used to cause the shock wave to withdraw within the channel and resume its normally desired position.

The reason for this behavior may be explained briefly as follows. A diffuser channel of this nature can normally be designed to perform its function properly only for a relatively narrow range of fluid flow velocities i.e. a narrow range of Mach numbers (Mach number at any point is the ratio at that point of the relative velocity between the fluid and the body to the velocity of sound); for example, it might be designed to convert from a Mach number two outside the diffuser to a Mach number slightly above one ahead of the normal shock wave. To that end, the diffuser is so designed that the cross-sectional area at any point longitudinally of channel 3 has a value such that pressure, velocity and other fluid conditions at that point are sufficient to give the Mach No. desired at that point. In other words, the transverse cross sectional area of channel 3 is everywhere such that the continuity equation $M = V\rho A$ is satisfied for the fluid density ($\rho$) necessary to establish the desired velocity (V) and correlated pressure. The latter equation expresses the obvious condition that the total fluid mass flow, M, must at any cross section of channel 3 equal the velocity (V) times the density ($\rho$) times the cross sectional area (A). However, during the initial starting period (or any period of reduced velocity), the Mach number of the fluid flow at the inlet is less than that (e.g. Mach No. 2) for which the mechanism was designed and thus the product $V\rho A$ is too small to permit establishment of all of the mass flow M for which the diffuser was designed. But the desired ultimate flow pattern, i.e. with the normal shock wave or a Mach number 1 condition at or near the throat 9 can not be established until the design value of M is established and as a consequence the normal shock establishes itself stably at line 15 and excess flow spills around and outside of member 5. Moreover, and for the same reasons, if the product V$\rho$A at any point and any time drops, even temporarily to a value smaller than the design value, the normal shock wave will tend to move upstream from thoat 9 into section 8 and then migrate further upstream, because of the unstable nature of normal shock waves in a converging diffuser channel, until it regurgitates completely out of channel 3 to assume the position of line 15.

The foregoing picture is aggravated by the fact that when a normal shock wave so establishes itself outside of the inlet orifice, the losses occurring in the shock wave are so great that there is a substantial diminution of what available energy is left in the fluid flow for establishing the desired design conditions farther downstream. Stated otherwise, the energy losses are so great that the V$\rho$ product of the continuity equation is insufficient to give the desired flow characteristics with the particular cross sectional areas of the diffuser at hand.

To summarize, under the foregoing undesirable conditions, the V$\rho$ product is everywhere insufficient to give the value which would exist if free flow at design pressure and velocity conditions existed in the inlet area and thus the normal desired flow patter nnever establishes itself until special measures are taken to effect that result. It is precisely such measures which the primary object of this invention contemplates and means for the purpose will be discussed presently.

At this point it is well to note a further characteristic of the foregoing condition which is useful in connection with the invention. When the desred flow pattern is established, the pressure at points (e.g. about line 16) in section 8 upstream of the throat section will be less than the pressure at points (e.g. about line 17) within the subsonic section 10 or in the combustion chamber 6. However, under the undesirable conditions existing when the normal shock wave has regurgitated outside of the inlet of channel, just the opposite pressure relationship exists. In that case, the pressure at those points in section 8 will be found to be greater than that at those points in section 10. This change in pressure relationship from the one condition to the other will as explained below be found to be of use in connection with the present invention.

It is found that the foregoing difficulties, i.e. the tendency of the normal shock wave to regurgitate and stay outside of the flow channel can be overcome by the expedient of the present invention. Generally speaking, these results are accomplished by temporarily changing the product V$\rho$A at points downstream from line 15 in such manner as to compensate for the difference between the design value of V$\rho$A at any such point and the value of V$\rho$A existing at that point under the condition when the normal shock wave is at line 15. With such compensation the shock wave may be forced downstream to its normally desired position. For example, the effective value of V$\rho$A may be increased by providing the diffuser channel with variable walls which may take the form of one or more controllable outlet orifices for controllably bleeding off a portion of the fluid flow in the section 8 of channel 3, or the form of a flexible wall member which controllably increases the cross sectional area of the diffuser channel in the vicinity of the throat temporarily during the period of low flow velocity attending the initial starting operation. If during the normal operation of the device the undesired conditions should re-establish themselves because of temporary diminution of velocity i.e. if the normal shock wave should regurgitate, then the normal desired flow pattern may be restored by repeating this process, and, as will be described in greater detail hereinafter, the aforementioned change in the pressure relationships between points near lines 16 and 17 for the two sets of conditions may be utilized to accomplish this restoring effect automatically.

In the Fig. 2 there is shown one embodiment of the invention in an aerodynamic device of the type shown in Fig. 1 and claimed in the aforesaid application. Fig. 2 differs from the Fig. 1 in the provision of one or more outlet channels 18, 19 and 20 for bleeding off a portion of the fluid flow in accordance with the principles previously discussed. The outlet channels may thus be viewed as constituting variable wall sections connected to the diffusion channel and as being capable of varying the effective wall area thereof. Each of the channels may be provided with any suitable closure mechanisms for opening and closing them to fluid flow, for example, the hinged door or valve members 21, 22 and 23 which close their respective channels 18, 19 and 20 when in their closed position shown. Members 21, 22 and 23 may be controllably opened or closed by any suitable remote control means (not shown) within the craft, for example, electrical or hydraulic control mechanisms well known in the art. Alternatively, they may as shown simply be held in their closed positions by suitable resilient means such as spring members 21a, 22a and 23a. If during the initial starting period the normal shock wave establishes itself near line 15 or if because of temporary diminution of flight velocity during normal usage, the normal shock wave regurgitates to the general position of the line 15, it may be restored to its normally desired position in the vicinity of the line 11 by bleeding off a portion of the fluid flow in the supersonic section 8 by opening the outlet channels 18, 19 and 20. Channels 18, 19 and 20 need be opened only by an amount sufficient to allow enough of the fluid flow to escape to cause the normal shock wave to assume its desired position. If desired, the latter operation may be effected automatically by proper selection of the spring members 21a, 22a and 23a such that they have sufficient strength to hold the members 21, 22 and 23 closed when the desired design pressure obtains in the channel 3 and yet are resiliently yieldable to the higher pressures existing at times when it is desired that they open to permit bleeding off of fluid flow from channel 3, i.e. when the normal shock wave is at the general position of line 15.

It will be found that the foregoing construction is of particular advantage in connection with reflected shock-wave chamber constructions of the type shown in the foregoing application and in the Figures 1 and 2. This is for the reason that for very high Mach numbers, e.g. those above about 2.6 the required transverse cross-sectional area of the outlets 18, 19 and 20 become inconveniently large for practical purposes. Therefore, in general their use may be somewhat restricted to positions wherein the Mach number is below about 2.6. It follows, therefore, that it is particularly convenient with reflected shock wave diffuser constructions because with the latter the Mach number is progressively reduced in the downstream direction of the section 8 of channel and therefore, the bleeding orifices may be positioned sufficiently far along the path of the reflected shock waves as to occur at a point where the Mach number has been reduced below about that value.

Among the further advantages of the foregoing construction may be mentioned at this point the following: (1) Since the undesirable phenomenon of shock wave regurgitation may now be controlled, it becomes permissible to design the diffusing channel with smaller cross sectional area ratios than heretofore, whereby a greater overall compression due to area change (in contra-distinction to pressure change due to shock wave) may be obtained without fear of producing a design which is impracticably unstable as regards the risk of shock wave regurgitation. (2) Such design decreases the Mach number at positions upstream of the normal shock wave which means that there is less energy loss through the normal shock wave. In net result the design, therefore, permits a closer approach to the desideratum of a reversible adiabatic diffusion, i.e. diffusion in which no loss occurs.

In the Fig. 3 there is shown an alternative means for accomplishing the result of the Fig. 2. In the Fig. 3, the effect desired is obtained by direct variation of the cross sectional area of the flow channel 3. In this case the variation is accomplished by controllable expansion or contraction of one or more flexible walls 24 and 25 welded or otherwise tightly sealed to members 4 and 5 respectively and constituting the boundaries of the flow channel. Such walls may constitute for example, flexible steel membranes or in certain cases possibly also a rubber or other flexible construction. Means may be provided for expanding the flexible walls 24 and 25 pneumatically or hydraulically such as by means of fluid pressure through the channels 26 and 27 opening into the space between the flexible walls and the members to which they are attached. Any suitable means (not shown) for causing fluid pressure to flow into the channels 26 and 27 may be used and operated from a suitable remote control point. It will be understood that during the normal desired operation of the device the flexible walls will be inflated in such manner that they assume the normal desired configuration of the channel during flight. During starting or other periods of reduced fluid flow they may be deflated so that they enlarge a cross sectional area of the channel and either prevent the formation of the normal shock waves outside of the inlet channel or restore it to its predetermined design position if it has regurgitated during flight because of temporary instability of flight conditions.

In the Figure 4, there is shown an arrangement substantially similar to that of the Figure 2. It differs however, in the provision of one or more automatic bleeding channels 28 and 29 operable in response to the aforementioned change in pressure relationships between points adjacent lines 16 and 17. Those channels may comprise simply conduits interconnecting orifices adjacent points in the vicinity of lines 16 and 17. While the structure is shown as involving channels of this type on either side of the channel 3, it will be understood that a single one will suffice if properly designed. The operation of these channels is as follows. During the initial starting period when it is desired to bleed off a certain amount of the fluid flow in order to cause the swallowing of the normal shock waves, the pressure in section 8 near line 16 will be greater than that in section 10 near line 17 and the fluid will therefore flow through the channels 28 and 29 and into the subsonic section 10. This auxiliary or shunting flow, therefore, will serve the dual purpose of causing shock wave swallowing in the manner already described, and at the same time the purpose of adding to the desired pressure build up in the subsonic section. After the shock wave has been swallowed and has assumed its normal desired position near the line 11, the pressure in section 10 will as already indicated, be greater than that in section 8. It is, therefore, desired that means be used to prevent the flow of fluid back through the channels 28 and 29. This could, of course, be accomplished by suitable valve means. However, it will be found that it can readily be accomplished by designing the initial sections 30 and 31 of the channels 28 and 29 in such manner that they effect within themselves a certain amount of diffusion or pressure increase of the fluid flow through them and thereby build up pressures substantially the same as those existing in section 10 during normal operation and thereby neutralizing any tendency for the fluid to flow back through the channels 28 and 29. It will be apparent, therefore, to those skilled in the art that the channel will automatically operate to correct for any conditions existing during flight which would cause the normal shock wave to regurgitate and at the same time will prevent the adverse effects of backward fluid flow.

It will be understood that the principles of automatic operation may also be applied to the Figure 3 construction simply by connecting either or both of channels 26 and 27 directly to an appropriate pressure region of the subsonic section 10. Thereupon, the high pressure of section 10 will maintain the walls 24 and 25 in inflated position during normal conditions of fluid flow at design conditions. When, because of regurgitation or during starting, the normal shock wave is outside of channel 3, that pressure will be low and the walls will deflate thus tending to effect the desired restoring action already described.

It will be understood that the fluid bled off by the construction in the Figure 2 may also be used for any other purposes such as cooling the combustion chamber when such is desired. Thus, the fluid flow enamating from the outlet channels 18, 19 and 20 may be directed through a suitable cooling jacket or cylinder surrounding combustion chamber 6.

Diffuser mechanisms of the foregoing character may also be used where the mechanism is stationary and the fluid moving through it, for example, in wind tunnels where they may be used to diffuse, i.e. decelerate the low pressure high velocity fluid flow in the working section of the wind tunnel back to higher pressure lower velocity flow which may be handled in the wind tunnel compressor or other means used for wind tunnel propulsion. By such means the starting of wind tunnels at supersonic velocities may be facilitated and their efficiency improved. The Figures 5 and 6 exemplify wind tunnel embodiments of the invention for the purpose. In both figures, the tunnel may comprise substantially the arrangement shown and claimed in the aforesaid application Serial No. 746,168.

In the Fig. 5 the wind tunnel is shown as comprising a fluid flow channel defined by a preferably cylindrical guiding wall 32 through which fluid such as air may be drawn for the purpose of studying the aerodynamic behavior of any desirable object such as an air foil 33 positioned in what may be termed the working section 34 (generally between the dotted lines 35 and 36) of the tunnel. The air may, for example, be drawn into the tunnel from the external atmosphere at normal atmospheric pressure through an inlet 37 by any suitable propulsion means such as an axial flow compressor 38 formed by the intermeshing blades 39 and 40 mounted respectively on a cylindrical rotor 41 and the wall 32 as a stator. Rotor 41 may be propelled by any suitable means 42 which may, for example, be an electric motor. In operation, the fluid flow may enter the inlet at atmospheric pressure, pass through the working section 34 at greatly decreased pressure but high (supersonic) velocity, and thereafter be restored to its original condition by the compressor. For the purpose of facilitating starting a plurality of outlet channels 18, 19 and 20 and control valves 21, 22 and 23 may be provided as in the case of Fig. 2 for which reason they have been given the same numerical designation. In all respects the operation of the chanels 18, 19 and 20 is the same as that of Fig. 2.

In the Figure 6, the wind tunnel there shown is substantially the same as that of the Figure 5 except that in the place of the outlet channels 18, 19 and 20 there has been provided the flexible wall mechanism of the Figure 4. The operation of the flexible walls 25 is precisely the same as that of its counterpart in the Figure 4 and therefore no further description of the operation need be stated.

While we have shown and described particular embodiments of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent, of the United States is:

1. A mechanism for converting supersonic elastic fluid flow to subsonic flow of relatively higher pressure comprising a diffusion channel within said mechanism having a supersonic section, a subsonic section and a throat section therebetween, said channel being adapted to establish a flow pattern having a normal shock wave in the vicinity of said throat section under fluid flow conditions existing throughout a predetermined range of operating conditions for which said mechanism is intended, and means operable under conditions outside said predetermined range for causing said normal shock wave to assume its position in the vicinity of said throat section and thereby facilitate establishment of said flow pattern, said means comprising an outlet channel connected to said supersonic section, an inlet channel connected to said subsonic section, and a duct interconnecting said outlet and inlet channels.

2. A mechanism for converting supersonic elastic fluid flow to subsonic flow of relatively higher pressure comprising a diffusion channel within said mechanism having a converging supersonic section, a diverging subsonic section, and a throat therebetween, an inlet orifice for said channel adapted to receive said fluid flow and means for changing the flow characteristics at points downstream from said inlet orifice to cause said fluid to assume its predetermined flow pattern under the predetermined fluid flow conditions existing during operations for which said mechanism is intended, said means comprising a variable wall section of said diffusion channel comprising an outlet channel connected to said diffusion channel for bleeding from said diffusion channel a portion of said fluid flow, and means for controlling said variable wall section to vary the effective wall area of said diffusion channel, said means comprising means for opening and closing said outlet channel.

3. A mechanism for converting supersonic elastic fluid flow to subsonic flow of relatively higher pressure comprising a diffusion channel within said mechanism having a converging supersonic section, a diverging subsonic section, and a throat therebetween, an inlet orifice for said channel adapted to receive said fluid flow and means for changing the flow characteristics at points downstream from said inlet orifice to cause said fluid to assume its predetermined flow pattern under the predetermined fluid flow conditions existing during operations for which said mechanism is intended, said means comprising a variable wall secton of said diffusion channel comprising an outlet channel connected to said diffusion channel for bleeding from said diffusion channel a portion of said fluid flow, and means for controlling said variable wall section to vary the effective wall area of said diffusion channel, said means comprising a closure mechanism for said outlet channel, and means responsive to pressure in said diffusion channel for maintaining said closure mechanism in channel closing position at the pressures existing under said predetermined flow conditions and permitting said closure member to assume a channel opening position at pressures above said pressures.

4. A mechanism for converting supersonic elastic fluid flow to subsonic flow of relatively higher pressure comprising a diffusion channel within said mechanism having a converging supersonic section, a diverging subsonic section, and a throat therebetween, an inlet orifice for said channel adapted to receive said fluid flow and means for changing the flow characteristics at points downstream from said inlet orifice to cause said fluid to assume its predetermined flow pattern under the predetermined fluid flow conditions existing during operations for which said mechanism is intended, said means comprising a variable wall section of said diffusion channel comprising an outlet channel connected to said diffusion channel for bleeding from said diffusion channel a portion of said fluid flow, and means for controlling said variable wall section to vary the effective wall area of said diffusion channel, said means comprising a closure mechanism for said outlet channel and resilient means responsive to pressure in said diffusion channel resiliently maintaining said closure mechanism in channel closing position at the pressures existing under said predetermined flow conditions and resiliently permitting said closure member to assume a channel opening position at pressures above said pressures.

5. A mechanism for converting supersonic elastic fluid flow to subsonic flow of relatively higher pressure comprising a diffusion channel within said mechanism having a converging supersonic section, a diverging subsonic section, and a throat therebetween, an inlet orifice for said channel adapted to receive said fluid flow and means for changing the flow characteristics at points downstream from said inlet orifice to cause said fluid to assume its predetermined flow pattern under the predetermined fluid flow conditions existing during operations for which said mechanism is intended, said means comprising a variable wall section of said diffusion channel comprising a plurality of outlet channels connected to said diffusion channel and spaced along the path of said fluid flow for bleeding from said diffusion channel a portion of said fluid flow, and means for controlling said variable wall section to vary the effective wall area of said diffusion channel comprising means for opening and closing said outlet channels.

6. A mechanism for converting supersonic elastic fluid flow to subsonic flow of relatively higher pressure comprising a diffusion channel within said mechanism having a converging supersonic section, a diverging subsonic section, and a throat therebetween, an inlet orifice for said channel adapted to receive said fluid flow and means for changing the flow characteristics at points downstream from said inlet orifice to cause said fluid to assume its predetermined flow pattern under the predetermined fluid flow conditions existing during operations for which said mechanism is intended, said means comprising a variable wall section of said diffusion channel comprising an inflatable member affixed to the wall of said diffusion channel, and means for controlling said variable wall section to vary the effective wall area of said diffusion channel comprising means for controllably inflating said member.

7. A mechanism for converting supersonic elastic fluid flow to subsonic flow of relatively higher pressure comprising a diffusion channel within said mechanism having a converging supersonic section, a diverging subsonic section, and a throat therebetween, an inlet orifice for said channel adapted to receive said fluid flow and means for changing the mass flow product at points downstream from said inlet orifice to bring said product closer to its predetermined value under the predetermined fluid flow conditions existing during operations for which said mechanism is intended, said means comprising a variable wall section of said diffusion channel comprising an outlet channel connected to said diffusion channel for bleeding from said diffusion channel a portion of said fluid flow, and means for varying said variable wall section to vary the effective wall area of said diffusion channel comprising means for opening and closing said outlet channel.

8. A mechanism for converting supersonic elastic fluid flow to subsonic flow of relatively higher pressure comprising a diffusion channel within said mechanism having a converging supersonic section, a diverging subsonic section, and a throat therebetween, an inlet orifice for said channel adapted to receive said fluid flow and means for changing the mass flow product at points downstream from said inlet orifice to bring said product closer to its predetermined value under the predetermined fluid flow conditions existing during operations for which said mechanism is intended, said means comprising a variable wall section of said diffusion channel comprising an outlet channel connected to said diffusion channel for bleeding from said diffusion channel a portion of said fluid flow, and means for varying said variable wall section to vary the effective wall area of said diffusion channel, said means comprising a closure mechanism for said outlet channel and means responsive to pressure in said diffusion channel maintaining said closure mechanism in channel closing position at the pressures existing under said predetermined flow conditions and permitting said closure member to assume a channel opening position at pressures above said pressures.

9. A mechanism for converting supersonic elastic fluid flow to subsonic flow of relatively higher pressure comprising a diffusion channel within said mechanism having a converging supersonic section, a diverging subsonic section, and a throat therebetween, an inlet orifice for said channel adapted to receive said fluid flow and means for changing the mass flow product at points downstream from said inlet orifice to bring said product closer to its predetermined value under the predetermined fluid flow conditions existing during operations for which said mechanism is intended, said means comprising a variable wall section of said diffusion channel comprising an outlet channel connected to said diffusion channel for bleeding from said diffusion channel a portion of said fluid flow, and means for varying said variable wall section to vary the effective wall area of said diffusion channel, said means comprising a closure mechanism for said outlet channel and resilient means responsive to pressure in said channel resiliently maintaining said closure mechanism in channel closing position at the pressures existing under said predetermined flow conditions and resiliently permitting said closure member to assume a channel opening position at pressures above said pressures.

10. A mechanism for converting supersonic elastic fluid flow to subsonic flow of relatively higher pressure comprising a diffusion channel within said mechanism having a converging supersonic section, a diverging subsonic section, and a throat therebetween, an inlet orifice for said channel adapted to receive said fluid flow and means for changing the mass flow product at points downstream from said inlet orifice to bring said product closer to its predetermined value under the predetermined fluid flow conditions existing during operations for which said mechanism is intended, said means comprising a variable wall section of said diffusion channel comprising a plurality of outlet channels connected to said diffusion channel and spaced along the path of said fluid flow for bleeding from said diffusion channel a portion of said fluid flow, and means for varying said variable wall section to vary the effective wall area of said diffusion channel comprising means for opening and closing said outlet channels.

11. A mechanism for converting supersonic elastic fluid flow to subsonic flow of relatively higher pressure comprising a diffusion channel within said mechanism having a converging supersonic section, a diverging subsonic section, and a throat therebetween, an inlet orifice for said channel adapted to receive said fluid flow and means for changing the mass flow product at points downstream from said inlet orifice to bring said product closer to its predetermined value under the predetermined fluid flow conditions existing during operations for which said mechanism is intended, said means comprising a variable wall section of said diffusion channel comprising an inflatable member affixed to the wall of said diffusion channel, and means for varying said variable wall section to vary the effective wall area of said channel comprising means for controllably inflating said member.

12. A mechanism for converting supersonic elastic fluid flow to subsonic flow of relatively higher pressure comprising a diffusion channel within said mechanism having a converging supersonic section, a diverging subsonic section, and a throat section therebetween, said channel acting to establish a flow pattern having a normal shock wave in the vicinity of said throat section under fluid flow conditions existing throughout a predetermined range of operating conditions for which said mechanism is intended, and means operable under conditions outside said predetermined range for causing said normal shock wave to assume its position in the vicinity of said throat section and thereby facilitate establishment of said flow pattern, said means comprising a variable wall section of said diffusion channel comprising an outlet channel connected to said diffusion channel for bleeding from said diffusion channel a portion of said fluid flow, and means for controlling said variable wall section to vary the effective wall area of said channel comprising means for opening and closing said outlet channel.

13. A mechanism for converting supersonic elastic fluid flow to subsonic flow of relatively higher pressure comprising a diffusion channel within said mechanism having a converging supersonic section, a diverging subsonic section, and a throat section therebetween, said channel acting to establish a flow pattern having a normal shock wave in the vicinity of said throat section under fluid flow conditions existing throughout a predetermined range of operating conditions for which said mechanism is intended, and means operable under conditions outside said predetermined range for causing said normal shock wave to assume its position in the vicinity of said throat section and thereby facilitate establishment of said flow pattern, said means comprising a variable wall section of said diffusion channel comprising an outlet channel connected to said supersonic section for bleeding from said supersonic section a portion of said fluid flow, and means for controlling said variable wall section to vary the effective wall area of said channel comprising means for opening and closing said outlet channel.

14. A mechanism for converting supersonic elastic fluid flow to subsonic flow of relatively higher pressure comprising a diffusion channel within said mechanism having a converging supersonic section, a diverging subsonic section, and a throat section therebetween, said channel acting to establish a flow pattern having a normal shock wave in the vicinity of said throat section under fluid flow conditions existing throughout a predetermined range of operating conditions for which said mechanism is intended, and means operable under conditions outside said predetermined range for causing said normal shock wave to assume its position in the vicinity of said throat section and thereby facilitate establishment of said flow pattern, said means comprising a variable wall section of said diffusion channel comprising an outlet channel connected to said supersonic section for bleeding from said supersonic section a portion of said fluid flow, and means for controlling said variable wall section to vary the effective wall area of said diffusion channel comprising means for opening and closing said outlet channel, said last mentioned means comprising a closure mechanism for said outlet channel, and means responsive to pressure in said supersonic section maintaining said closure mechanism in channel closing position at the pressure existing throughout said predetermined range and permitting said closure member to assume a channel opening position at pressures above said pressures.

15. A mechanism for converting supersonic elastic fluid flow to subsonic flow of relatively higher pressure comprising a diffusion channel within said mechanism having a converging supersonic section, a diverging subsonic section, and a throat section therebetween, said channel acting to establish a flow pattern having a normal shock wave in the vicinity of said throat section under fluid flow conditions existing throughout a predetermined range of operating conditions for which said mechanism is intended, and means operable under conditions outside said predetermined range for causing said normal shock wave to assume its position in the vicinity of said throat section and thereby facilitate establishment of said flow pattern, said means comprising a variable wall section of said diffusion channel comprising an outlet channel connected to said supersonic section for bleeding from said supersonic section a portion of said fluid flow, and means for controlling said variable wall section to vary the effective wall area of said diffusion channel comprising means for opening and closing said outlet channel, said last mentioned means comprising a closure mechanism for said outlet channel and resilient means responsive to pressure in said supersonic section resiliently maintaining said closure mechanism in channel closing position at the pressures throughout said predetermined range and resiliently permitting said closure member to assume a channel opening position at pressures above said pressures.

16. A mechanism for converting supersonic elastic fluid flow to subsonic flow of relatively higher pressure comprising a diffusion channel within said mechanism having a converging supersonic section, a diverging subsonic section, and a throat section therebetween, said channel acting to establish a flow pattern having a normal shock wave in the vicinity of said throat section under fluid flow conditions existing throughout a predetermined range of operating conditions for which said mechanism is intended, and means operable under conditions outside said predetermined range for causing said normal shock wave to assume its position in the vicinity of said throat section and thereby facilitate establishment of said flow pattern, said means comprising a variable wall section of said diffusion channel comprising a plurality of outlet channels connected to said supersonic section and spaced along the path of said fluid flow for bleeding from said supersonic section a portion of said fluid flow, and means for controlling said variable wall section to vary the effective wall area of said diffusion channel comprising means for opening and closing said outlet channels.

17. A mechanism for converting supersonic elastic fluid flow to subsonic flow of relatively higher pressure comprising a diffusion channel within said mechanism having a converging supersonic section, a diverging subsonic section, and a throat section therebetween, said channel acting to establish a flow pattern having a normal shock wave in the vicinity of said throat section under fluid flow conditions existing throughout a predetermined range of operating conditions for which said mechanism is intended, and means operable under conditions outside said predetermined range for causing said normal shock wave to assume its position in the vicinity of said throat section and thereby facilitate establishment of said flow pattern, said means comprising a variable wall section of said diffusion channel comprising an inflatable member affixed to the wall of said diffusion channel, and means for controlling said variable wall section to vary the effective wall area of said diffusion channel comprising means for controllably inflating said member.

18. A mechanism for converting supersonic elastic fluid flow to subsonic flow of relatively higher pressure comprising a diffusion channel within said mechanism having a supersonic section, a subsonic section, and a throat section therebetween, said channel being adapted to establish a flow pattern having a normal shock wave in the vicinity of said throat section under fluid flow conditions existing throughout a predetermined range of operating conditions for which said mechanism is intended, and means operable under conditions outside said predetermined range for causing said normal shock wave to assume its position in the vicinity of said throat section and thereby facilitate establishment of said flow pattern, said means comprising an outlet channel connected to said supersonic section, an inlet channel connected to said subsonic section, and a duct interconnecting said outlet and inlet channels, said duct including means for preventing backflow of fluid from said inlet channel to said outlet channel under pressures existing throughout said predetermined range.

19. A mechanism for converting supersonic elastic fluid flow to subsonic flow of relatively higher pressure comprising a diffusion channel within said mechanism having a supersonic section, a subsonic section, and a throat section therebetween, said channel being adapted to establish a flow pattern having a normal shock wave in the vicinity of said throat section under fluid flow conditions existing throughout a predetermined range of operating conditions for which said mechanism is intended, and means operable under conditions outside said predetermined range for causing said normal shock wave to assume its position in the vicinity of said throat section and thereby facilitate establishment of said flow pattern, said means comprising an outlet channel connected to said supersonic section, an inlet channel connected to said subsonic section, and a duct interconnecting said outlet and inlet channels, said duct constituting a diffusion channel which effects an amount of fluid pressure increase therein under pressures existing throughout said predetermined range sufficient to prevent said backflow.

References Cited in the file of this patent

UNITED STATES PATENTS

| | | |
|---|---|---|
| 589,466 | Curtis | Sept. 7, 1897 |
| 837,934 | Kerr | Dec. 11, 1906 |
| 1,030,890 | Johnson | July 2, 1912 |
| 1,561,835 | Dahlstrand | Nov. 17, 1925 |
| 2,297,535 | Bryant | Sept. 29, 1942 |
| 2,344,835 | Stalker | Mar. 21, 1944 |
| 2,361,887 | Travpel | Oct. 31, 1944 |
| 2,427,845 | Forsyth | Sept. 23, 1947 |